(12) United States Patent
Jung et al.

(10) Patent No.: US 8,929,237 B2
(45) Date of Patent: Jan. 6, 2015

(54) METHOD AND APPARATUS FOR PERFORMING MEASUREMENT IN A WIRELESS COMMUNICATION SYSTEM

(75) Inventors: Sung Hoon Jung, Anyang-si (KR); Sung Duck Chun, Anyang-si (KR); Seung June Yi, Anyang-si (KR); Young Dae Lee, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 5 days.

(21) Appl. No.: 13/582,851

(22) PCT Filed: Mar. 25, 2011

(86) PCT No.: PCT/KR2011/002052
§ 371 (c)(1), (2), (4) Date: Sep. 5, 2012

(87) PCT Pub. No.: WO2011/119002
PCT Pub. Date: Sep. 29, 2011

(65) Prior Publication Data
US 2012/0327802 A1 Dec. 27, 2012

Related U.S. Application Data

(60) Provisional application No. 61/317,711, filed on Mar. 26, 2010, provisional application No. 61/330,888, filed on May 4, 2010.

(51) Int. Cl.
| | | |
|---|---|---|
| G01R 31/08 | (2006.01) | |
| G06F 11/00 | (2006.01) | |
| G08C 15/00 | (2006.01) | |
| H04J 1/16 | (2006.01) | |
| H04J 3/14 | (2006.01) | |
| H04L 1/00 | (2006.01) | |
| H04L 12/26 | (2006.01) | |
| H04W 4/00 | (2009.01) | |
| H04J 4/00 | (2006.01) | |
| H04W 36/00 | (2009.01) | |
| H04W 24/10 | (2009.01) | |

(52) U.S. Cl.
CPC .......... *H04W 36/0094* (2013.01); *H04W 24/10* (2013.01)
USPC ........... 370/252; 370/328; 370/329; 370/331; 455/436

(58) Field of Classification Search
CPC ............... H04W 24/00–24/10; H04W 72/005; H04W 72/02; H04W 72/04; H04W 72/12
USPC .......... 370/252, 331, 329, 311, 328; 455/436, 455/452.1, 226.1, 522, 226.2
See application file for complete search history.

(56) References Cited

U.S. PATENT DOCUMENTS

| | | | | |
|---|---|---|---|---|
| 6,570,861 | B1 * | 5/2003 | Marsan et al. | 370/330 |
| 6,571,084 | B1 * | 5/2003 | Jabbary | 455/69 |
| 2006/0013172 | A1 * | 1/2006 | Ruuska et al. | 370/338 |
| 2007/0253473 | A1 * | 11/2007 | Ishii et al. | 375/224 |
| 2008/0004023 | A1 * | 1/2008 | Chen et al. | 455/436 |
| 2008/0171553 | A1 * | 7/2008 | Ren et al. | 455/450 |
| 2010/0105377 | A1 * | 4/2010 | Iwamura et al. | 455/424 |
| 2011/0176430 | A1 * | 7/2011 | Zetterberg et al. | 370/242 |

OTHER PUBLICATIONS

"Miscellaneous corrections from REL-9 ASN.1 review," 3GPP TSG-RAN2 Meeting #69, R2-101933, Feb. 2010, pp. 1-241.
Ericsson, "Logged MDT measurement reporting", 3GPP TSG-RAN WG2 #69, R2-101425, Feb. 2010, pp. 1-2.
Vodafone, "Mechanisms for Delayed Reporting in Connected Mode", 3GPP TSG RAN WG2 #69, R2-101297, Feb. 22-26, 2010, pp. 1-5.
Ericsson et al., Carrier Aggregation and the s-Measure Criterion, 3GPP TSG-RAN WG2 #69, Agenda Item 07.1.05, Tdoc R2-101200, San Francisco, California, USA, Feb. 22-26, 2010, 4 pages.

* cited by examiner

*Primary Examiner* — Benjamin H Elliott, IV
*Assistant Examiner* — Eric Nowlin
(74) *Attorney, Agent, or Firm* — Birch, Stewart, Kolasch & Birch, LLP

(57) ABSTRACT

A method and an apparatus for performing measurement in a wireless communication system is provided. A user equipment determines a reference quality value based on quality values of a plurality of serving cells; determines a management object by comparing the reference quality value with a plurality of threshold values, and performs measurement on the management object.

6 Claims, 15 Drawing Sheets

METHOD AND APPARATUS FOR PERFORMING MEASUREMENT IN A WIRELESS COMMUNICATION SYSTEM

This application is the National Phase of PCT/KR2011/002052 filed on Mar. 25, 2011, which claims priority under 35 U.S.C. 119(e) to the U.S. Provisional Application Nos. 61/317,711 filed on Mar. 26, 2010 and 61/330,888 filed on May 4, 2010, all of which are hereby expressly incorporated by reference into the present application.

BACKGROUND

1. Field of the Invention

The present invention relates to wireless communication and, more particularly, to a method and apparatus for performing measurement in a wireless communication system.

2. Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

Techniques introduced to a 3GPP LTE-A includes carrier aggregation, a relay, and the like. The 3GPP LTE system is a single carrier system supporting only a single band width (i.e., a single component carrier) among 1.4, 3, 5, 10, 15, 20} MHz. However, LTE-A adopts multi-carrier using carrier aggregation. A component carrier is defined by a center frequency and a bandwidth. A multi-carrier system uses a plurality of component carriers having a band width smaller than the overall band width.

A terminal (or a user equipment (UE)) continuously performs measurement in order to maintain quality of a wireless link with a serving cell from which the UE is provided with a service. A cell or a frequency to be measured is called an object to be measured (or a measurement object), and a reporting configuration causing a report of a measurement result is independently associated to each management object. A UE performs measurement on management objects, and when a reporting configuration is satisfied, the UE reports measurement results to a base station.

In an existing measurement configuration structure, a reporting configuration may be associated with only one management object. However, as the multiple carriers have been introduced, there may be a plurality of serving cells, but how a plurality of serving cells are to be measured is yet to be presented.

SUMMARY

An aspect of the present invention provides a method and apparatus for performing measurement on a plurality of serving cells.

In an aspect, a method for performing measurement by a user equipment (UE) in a wireless communication system is provided. The method includes: determining a reference quality value based on quality values of a plurality of serving cells; determining a management object by comparing the reference quality value with a plurality of threshold values; and performing measurement on the management object.

The plurality of threshold values may include a first threshold value and a second threshold value.

When the reference quality value is greater than the first threshold value, a first management object may be determined as the management object. When the reference quality value is between the first threshold value and the second threshold value, a second management object may be determined as the management object. And, when the reference quality value is smaller than the first threshold value, a third management object may be determined as the management object.

The first management object may include the plurality of serving cells.

The second management object may include the plurality of serving cells and neighbor cells on a plurality of serving frequencies corresponding to the plurality of serving cells.

The third management object may include the plurality of serving cells, neighbor cells on a plurality of serving frequencies corresponding to the plurality of serving cells, and cells on non-serving frequencies.

In another aspect, an apparatus for performing measurement in a wireless communication system is provided. The apparatus includes: a radio frequency (RF) unit configured to transmit and receive a radio signal; and a processor connected to the RF unit. The processor is configured to: determine a reference quality value based on quality values of a plurality of serving cells, determine a management object by comparing the reference quality value with a plurality of threshold values, and perform measurement on the management object.

According to embodiments of the present invention, power consumption of a UE used for measurement while maintaining quality of service (QoS) of the UE, when a plurality of serving cells are set.

DETAILED DESCRIPTION OF THE PREFERRED EMBODIMENT

Figure 1:
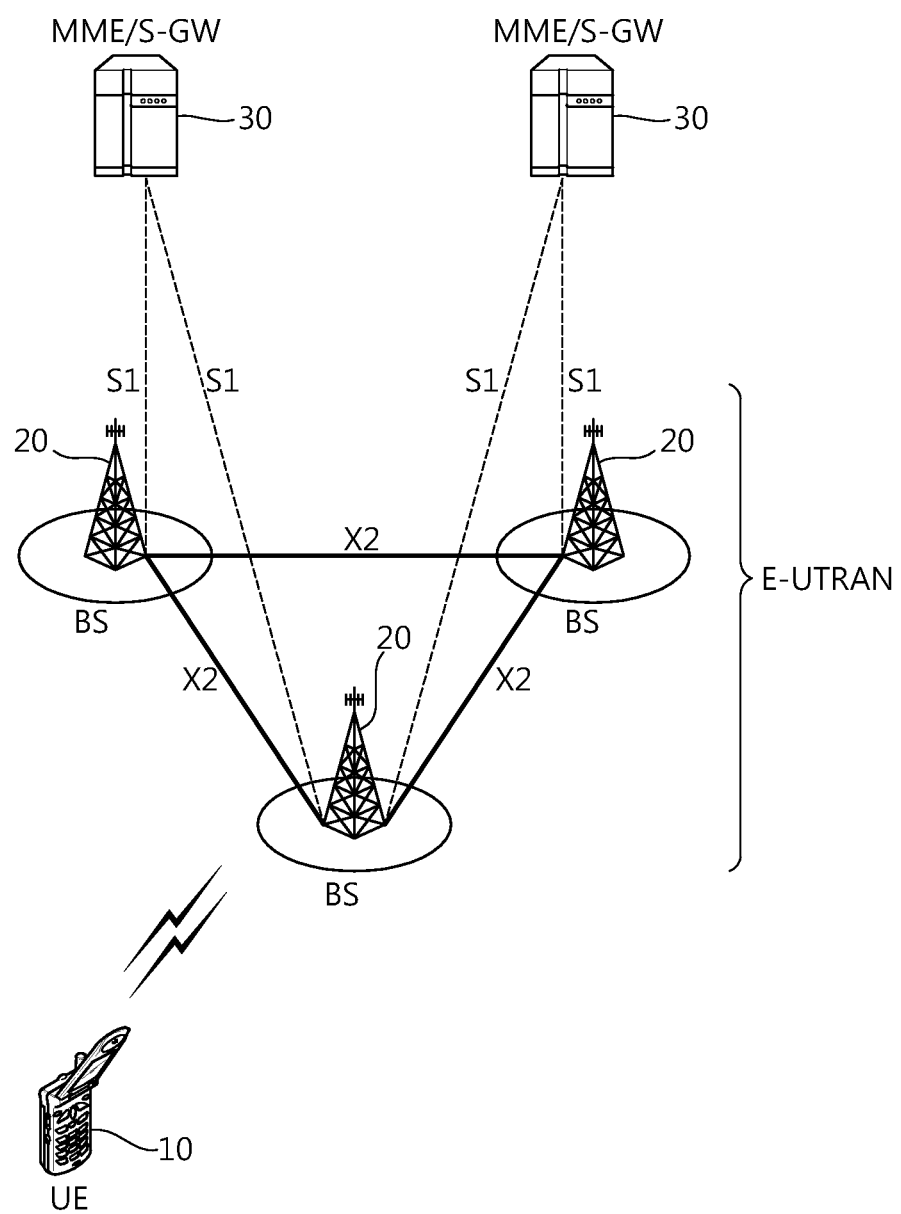
FIG. 1 illustrates a wireless communication system to which the present invention is applied.

FIG. 1 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
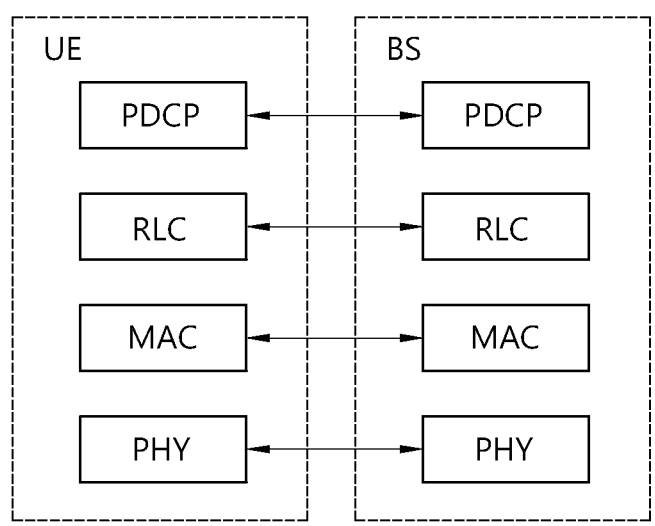
FIG. 2 is a diagram illustrating a radio protocol architecture for a user plane.
Figure 3:
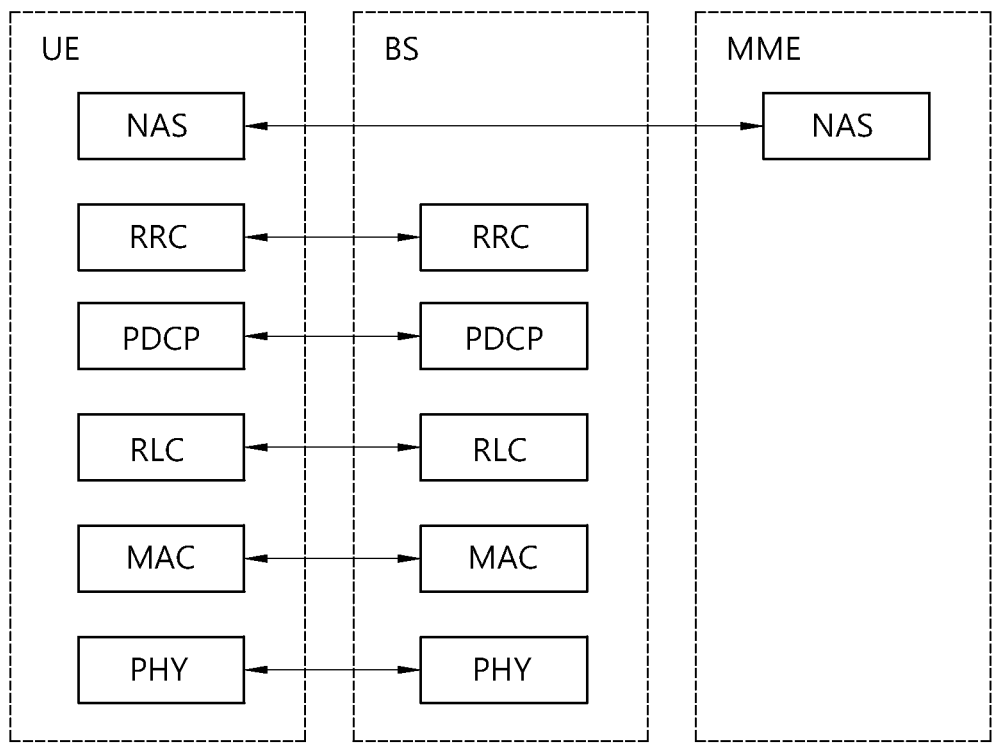
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC connected state, and otherwise the UE is in an RRC idle state.

Data are transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Further, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

Hereinafter, an RRC state of a UE and an RRC connection will be disclosed.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a procedure of registering to the network through an initial attach procedure. If the attach procedure is successfully completed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Next, system information will be disclosed.

The system information includes essential information that needs to be known to a UE to access a BS. Thus, the UE has to receive all system information before accessing the BS. Further, the UE always has to have the latest system information. Since the system information is information that must be known to all UEs in one cell, the BS periodically transmits the system information.

According to the section 5.2.2 of 3GPP TS 36.331 V8.7.0 (2009-09) "Radio Resource Control (RRC); Protocol specification (Release 8)", the system information is classified into a master information block (MIB), a scheduled block (SB), and a system information block (SIB). The MIB allows the UE to know a physical configuration (e.g., bandwidth) of a specific cell. The SB reports transmission information (e.g., a transmission period or the like) of SIBs. The SIB is a group of a plurality of pieces of system information related to each other. For example, an SIB includes only information of a neighboring cell, and another SIB includes only information of an uplink radio channel used by the UE.

In general, a service provided by the network to the UE can be classified into three types to be described below. Further, according to which service can be provided, the UE recognizes a cell type differently. A service type will be first described below, and then the cell type will be described.

1) Limited service: This service provides an emergency call and an earthquake and tsunami warning system (ETWS), and can be provided in an acceptable cell.

2) Normal service: This service denotes a public use service for general use, and can be provided in a suitable or normal cell.

3) Operator service: This service denotes a service for a network service provider, and a cell can be used only by the network service provider and cannot be used by a normal user.

A service type provided by a cell can be identified as follows.

1) Acceptable cell: A UE can receive a limited service in this cell. This cell is not barred from the perspective of the UE, and satisfies a cell selection criterion of the UE.

2) Suitable cell: The UE can receive a regular service in this cell. This cell satisfies a condition of an acceptable cell, and also satisfies additional conditions. Regarding the additional conditions, this cell has to belong to a PLMN to which the UE can access, and a tracking area update procedure of the UE must not be barred in this cell. If a specific cell is a CSG cell, this cell must be accessible by the UE as a CSG member.

3) Barred cell: Information indicating that a cell is a barred cell is broadcast in this cell by using system information.

4) Reserved cell: Information indicating that a cell is a reserved cell is broadcast in this cell by using system information.

Now, a radio link failure will be described.

A UE persistently performs measurement to maintain quality of a radio link with a serving cell from which the UE receives a service. The UE determines whether communication is impossible in a current situation due to deterioration of the quality of the radio link with the serving cell. If it is determined that the quality of the serving cell is so poor that communication is almost impossible, the UE determines the current situation as a radio link failure.

If the radio link failure is determined, the UE gives up maintaining communication with the current serving cell, selects a new cell through a cell selection (or cell reselection) procedure, and attempts RRC connection re-establishment to the new cell.

Figure 4:
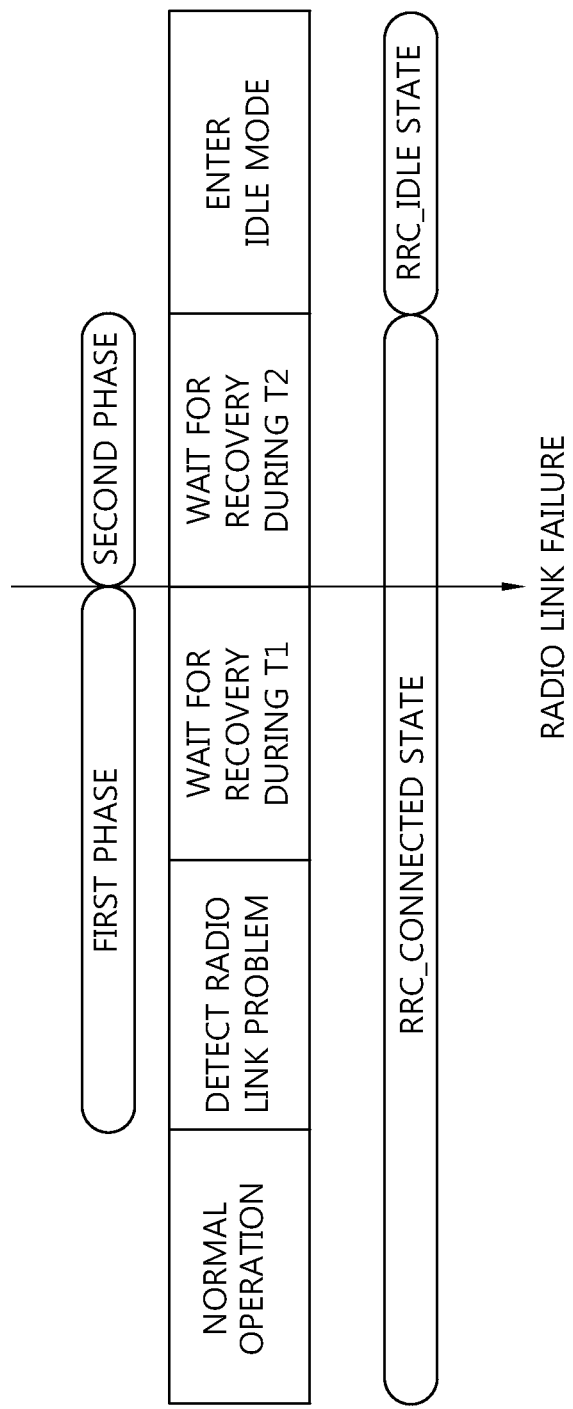
FIG. 4 shows an example of a radio link failure. An operation related to the radio link failure can be described in two phases.

FIG. 4 shows an example of a radio link failure. An operation related to the radio link failure can be described in two phases.

In a first phase, while performing a normal operation, a UE determines whether a current communication link has a problem. Upon detecting the problem, the UE declares a radio link problem, and waits for a recovery of the radio link during a first wait time T1. If the radio link is recovered before the expiry of the first wait time T1, the UE re-performs the normal operation. If the radio link is not recovered until the first wait time expires, the UE declares the radio link failure, and enters a second phase.

In the second phase, the UE waits again for the recovery of the radio link during a second wait time T2. If the radio link is not recovered until the second wait time expires, the UE enters an RRC idle state. Alternatively, the UE may perform an RRC re-establishment procedure.

The RRC connection re-establishment procedure is a procedure for re-establishing an RRC connection in an RRC connected state. Since the UE does not enter the RRC idle state, the UE does not initiate all connection configurations (e.g., radio bearer configuration, or the like). Instead, when the RRC connection re-establishment procedure starts, the UE temporarily suspends the use of other radio bearers except for an SRB. If the RRC connection re-establishment is successful, the UE resumes the use of radio bearers of which the use is temporarily suspended.

Figure 5:
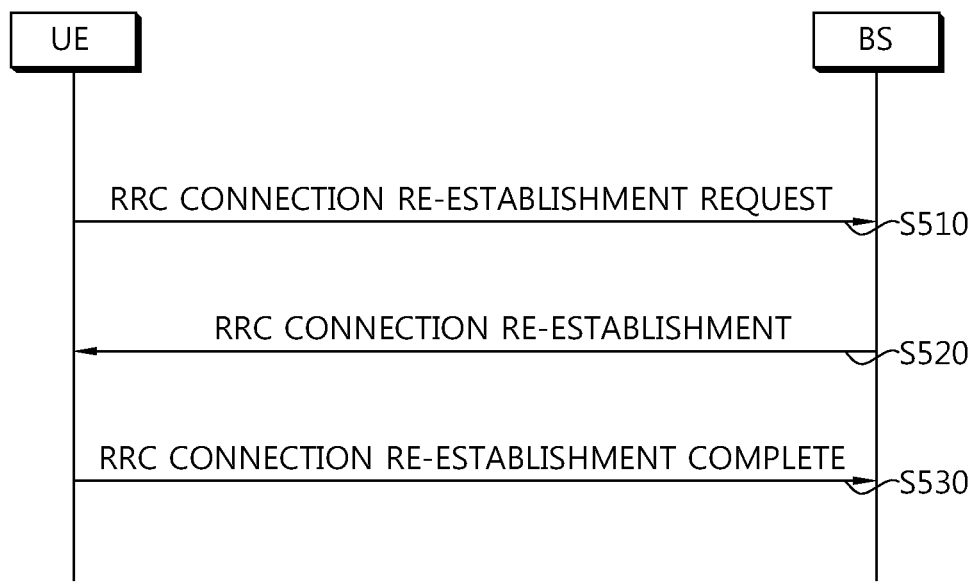
FIG. 5 is a flowchart showing a success of a connection re-establishment procedure.

FIG. 5 is a flowchart showing a success of a connection re-establishment procedure.

A UE performs cell selection to select a cell. The UE receives system information to receive basis parameters for cell access in the selected cell. Then, the UE sends an RRC connection re-establishment request message to a BS (step S510).

If the selected cell is a cell having the context of the UE, i.e., a prepared cell, the BS accepts the RRC connection re-establishment request of the UE, and transmits an RRC connection re-establishment message to the UE (step S520). The UE transmits an RRC connection re-establishment complete message to the BS, and thus the RRC connection re-establishment procedure can be successful (step S530).

Figure 6:
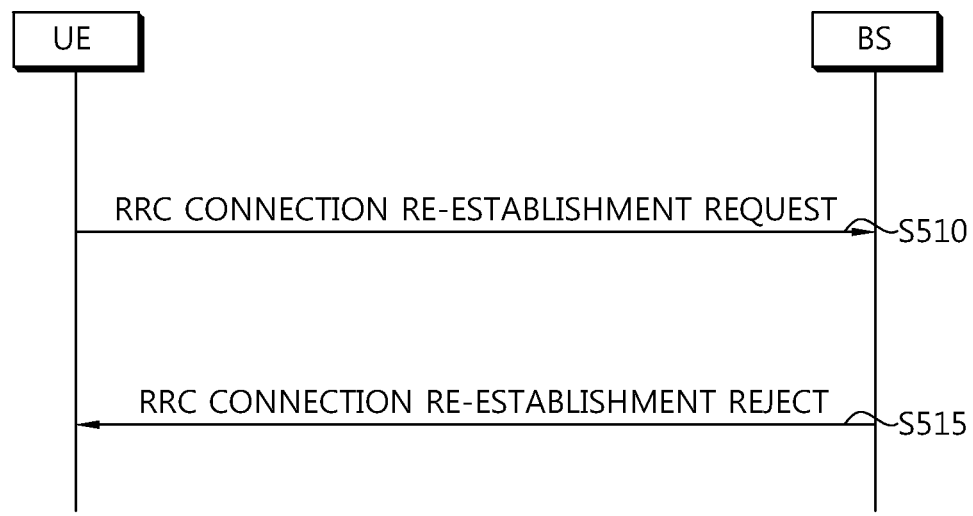
FIG. 6 is a flowchart showing a failure of a connection re-establishment procedure.

FIG. 6 is a flowchart showing a failure of a connection re-establishment procedure. A UE transmits an RRC connection re-establishment request message to a BS (step S510). If a selected cell is not a prepared cell, a BS transmits an RRC connection re-establishment reject message to the UE in response to an RRC connection re-establishment request (step S515).

The following description is related to measurement and measurement report.

It is necessary for a mobile communication system to support mobility of a UE. Therefore, the UE persistently measures quality of a serving cell providing a current service and quality of a neighboring cell. The UE reports a measurement result to a network at a proper time. The network provides optimal mobility to the UE by using a handover or the like.

To provide information which can be helpful for a network operation of a service provider in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identify (also referred to as a global cell identity) of the specific cell, location identification information indicating a location of the specific cell (e.g., a tracking area code), and/or other cell information (e.g., whether it is a member of a closed subscriber group (CSG) cell).

In a state of moving, if the UE determines that quality of a specific region is significantly bad, the UE may report a measurement result and location information on cells with bad quality to the network. The network may attempt to optimize the network on the basis of the measurement result reported from UEs which assist the network operation.

In a mobile communication system having a frequency reuse factor of 1, mobility is generally supported between different cells existing in the same frequency band. Therefore, in order to properly guarantee the UE mobility, the UE has to properly measure cell information and quality of neighboring cells having the same center frequency as a center frequency of a serving cell. Measurement on a cell having the same center frequency as the center frequency of the serving cell is referred to as intra-frequency measurement. The UE performs the intra-frequency measurement and reports a measurement result to the network, so as to achieve the purpose of the measurement result.

A mobile communication service provider may perform a network operation by using a plurality of frequency bands. If a service of a communication system is provided by using the plurality of frequency bands, optimal mobility can be guaranteed to the UE when the UE is able to properly measure cell information and quality of neighboring cells having a different center frequency from the center frequency of the serving cell. Measurement on a cell having the different center frequency from the center frequency of the serving cell is referred to as inter-frequency measurement. The UE has to be able to perform the inter-frequency measurement and report a measurement result to the network.

When the UE supports measurement on a heterogeneous network, measurement on a cell of the heterogeneous network may be performed according to a configuration of a BS. Such a measurement on the heterogeneous network is referred to as inter-radio access technology (RAT) measurement. For example, RAT may include a GMS EDGE radio access network (GERAN) and a UMTS terrestrial radio access network (UTRAN) conforming to the 3GPP standard, and may also include a CDMA 200 system conforming to the 3GPP2 standard.

Figure 7:
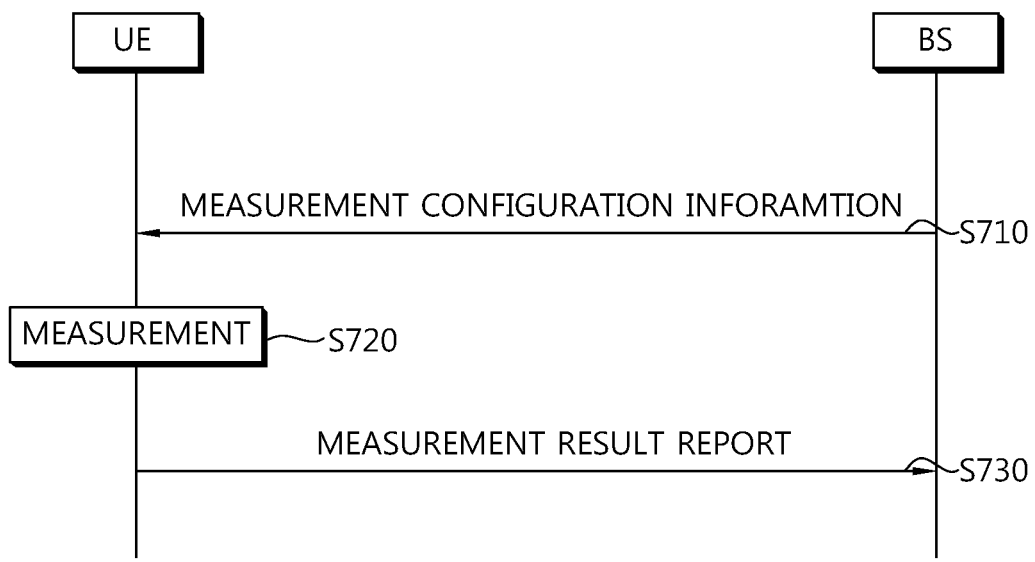
FIG. 7 is a flowchart illustrating the existing method of performing measurement.

FIG. 7 is a flowchart illustrating the existing method of performing measurement.

A UE receives measurement configuration information from a BS (step S810). A message including the measurement configuration information is referred to as a measurement configuration message. The UE performs measurement based on the measurement configuration information (step S820). If a measurement result satisfies a reporting condition included in the measurement configuration information, the UE reports the measurement result to the BS (step S830). A message including the measurement result is referred to as a measurement report message.

The measurement configuration information may include the following information.

(1) Measurement object: The object is on which the UE performs the measurements. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting configuration: This includes a reporting criterion and a reporting format. The reporting criterion is used to trigger the UE to send a measurement report and can either be periodical or a single event description. The reporting format is a quantity that the UE includes in the measurement report and associated information (e.g. number of cells to report).

(3) Measurement identify: Each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in the measurement report. The measurement identify may be included in the measurement report to indicate a specific measurement object for which the measurement result is obtained and a specific reporting condition according to which the measurement report is triggered.

(4) Quantity configuration: One quantity configuration is configured per RAT type. The quantity configuration defines the measurement quantities and associated filtering used for all event evaluation and related reporting of that measurement type. One filter can be configured per measurement quantity.

(5) Measurement gaps: Measurement gaps are periods that the UE may use to perform measurements when downlink transmission and uplink transmission are not scheduled.

UE has a measurement object list, a measurement reporting configuration list, and a measurement ID list in order perform a measurement procedure.

In 3GPP LTE, the BS can assign only one measurement object to the UE with respect to one frequency. Events for triggering measurement reporting shown in the table below are defined in the section 5.5.4 of 3GPP TS 36.331 V8.5.0 (2009-03) "Evolved Universal Terrestrial Radio Access (E-UTRA) Radio Resource Control (RRC); Protocol specification (Release 8)".

TABLE 1

| EVENT | REPORT CONDITION |
| --- | --- |
| Event A1 | Serving becomes better than threshold |
| Event A2 | Serving becomes worse than threshold |
| Event A3 | Neighbour becomes offset better than serving |
| Event A4 | Neighbour becomes better than threshold |
| Event A5 | Serving becomes worse than threshold1 and neighbour becomes better than threshold2 |
| Event B1 | Inter RAT neighbour becomes better than threshold |
| Event B2 | Serving becomes worse than threshold1 and inter RAT neighbour becomes better than threshold2 |

If the measurement result of the UE satisfies the determined event, the UE transmits a measurement report message to the BS.

Figure 8:
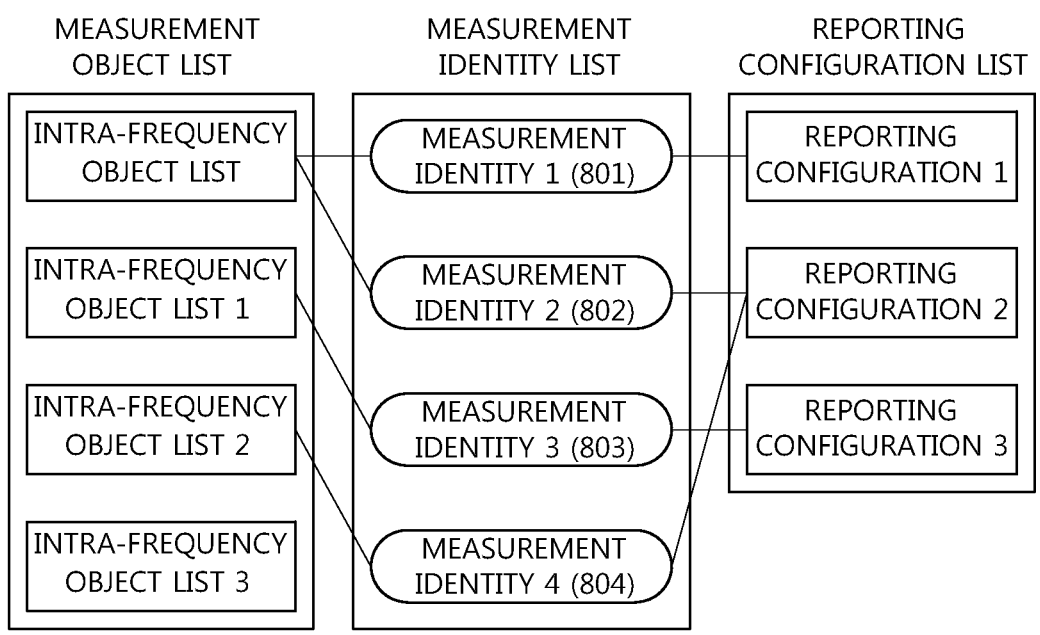
FIG. 8 shows an example of a measurement configuration assigned to a UE.

FIG. 8 shows an example of a measurement configuration assigned to a UE.

First, a measurement identity1 801 associates an intra-frequency measurement object with a reporting configuration 1. The UE performs intra-frequency measurement. The reporting configuration 1 is used to determine a reporting type and a criterion for reporting a measurement result.

A measurement identity2 802 is associated with the intra-frequency measurement object similarly to the measurement identifier1 801, and associates the intra-frequency measurement object with a reporting configuration 2. The UE performs intra-frequency measurement. The reporting configuration 2 is used to determine a reporting format and a criterion for reporting a measurement result.

By using the measurement identity1 801 and the measurement identity2 802, the UE transmits a measurement result even if the measurement result on the intra-frequency measurement object satisfies any one of the reporting configuration 1 and the reporting configuration 2.

A measurement identity3 803 associates an inter-frequency measurement object 1 with a reporting configuration 3. When a measurement result on the inter-frequency measurement object 1 satisfies a reporting criterion included in the reporting configuration 1, the UE reports the measurement result.

measurement identity4 804 associates an inter-frequency measurement object 2 with the reporting configuration 2. When a measurement result on the inter-frequency measurement object 2 satisfies a reporting criterion included in the reporting configuration 2, the UE reports the measurement result.

Meanwhile, the measurement object, the reporting configuration, and/or the measurement identity can be added, modified, and/or deleted. To instruct such operations, the BS may transmit to the UE a new measurement configuration message or a measurement configuration modification message.

Figure 9:
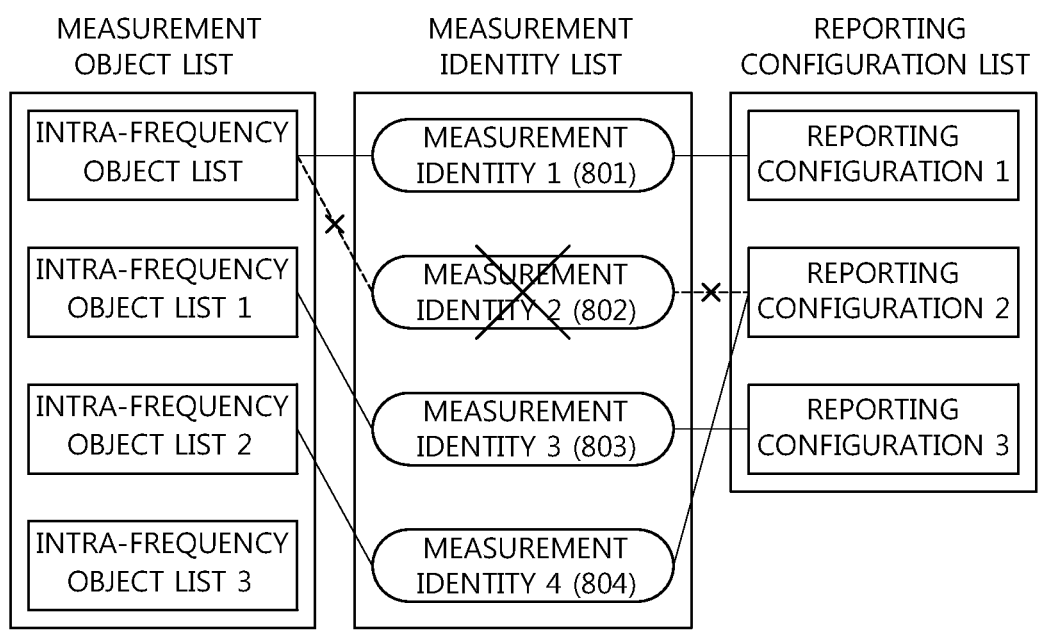
FIG. 9 shows an example of deleting a measurement identity.

FIG. 9 shows an example of deleting a measurement identity. When a measurement identity2 802 is deleted, measurement on a measurement object associated with the measurement identity2 802 is suspended, and a measurement report is not transmitted. A reporting configuration or a measurement object associated with the deleted measurement identity may not be modified.

Figure 10:
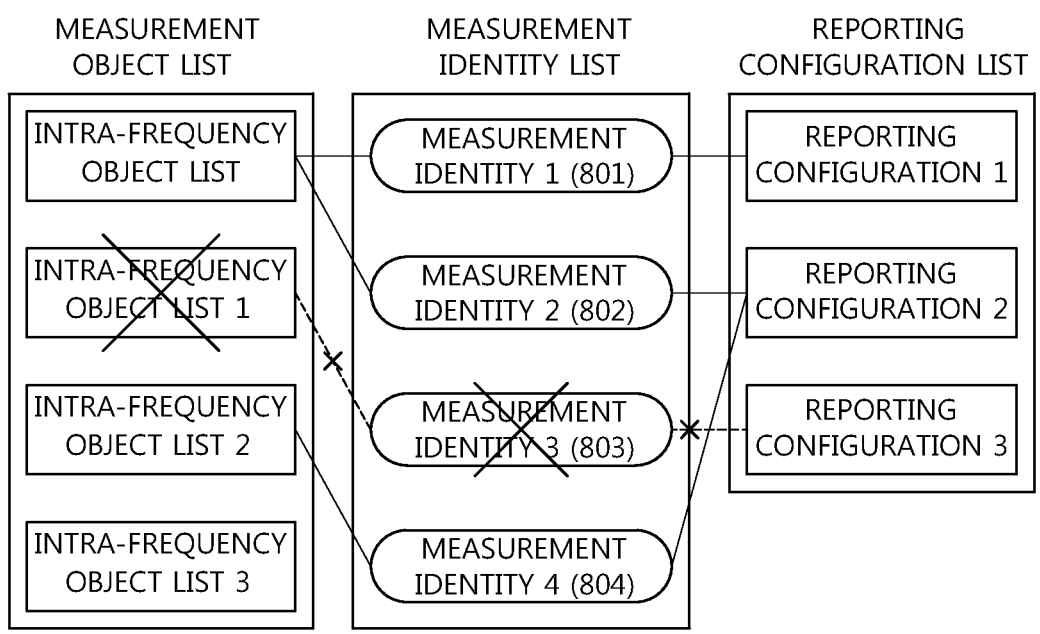
FIG. 10 shows an example of deleting a measurement object.

FIG. 10 shows an example of deleting a measurement object. When an inter-frequency measurement object 1 is deleted, a UE also deletes an associated measurement identifier3 803. Measurement on the inter-frequency measurement object 1 is suspended, and a measurement report is not transmitted. However, a reporting configuration associated with the deleted inter-frequency measurement object 1 may not be modified or deleted.

When the reporting configuration is deleted, the UE also deletes an associated measurement identifier. The UE suspends measurement on an associated measurement object according to the associated measurement identifier. Measurement on the measurement object and measurement reporting are suspended. However, a measurement object associated with the deleted reporting configuration may not be modified or deleted.

When a UE receives measurement configuration, the UE performs measurement on a management object to which a measurement identifier is connected. Over the results of the performed measurement, the UE evaluates whether or not the results satisfy measurement report conditions based on a reporting configuration included in the measurement configuration. When the results satisfy report condition included in the reporting configuration, the UE transmits a measurement report message including measurement report information to a network.

The measurement report message includes following information.

Measurement identifier: It is a measurement identifier associated with the reporting configuration satisfying the report condition. The network may know on what reference the measurement report received from the UE has been transmitted, through the measurement identifier.

Quality value of measured serving cell: It is a quality value of a serving cell measured by the UE.

Information regarding measured neighboring cell: It is a measurement identifier of a neighboring cell measured by the UE, which includes an identifier and a quality value of a neighboring cell. The identifier of a neighboring cell is a physical cell identifier of a neighboring cell that satisfies the report condition. The quality of a neighboring cell is a quality vale of a neighboring cell that satisfies the report condition.

Hereinafter, a multi-carrier system will be described.

A 3GPP LTE system supports a case in which a downlink bandwidth and an uplink bandwidth are differently set, which, however, premises a single component carrier (CC). A CC is defined by a center frequency and a bandwidth. This means that the 3GPP LTE system supports only a case in which a bandwidth of downlink and that of uplink are the same or different in a state in which a single CC is defined for downlink and uplink, respectively. For example, the 3GPP LTE system supports a maximum of 20 MHz and only a single CC in uplink and downlink although an uplink bandwidth and a downlink bandwidth are different.

A pair of downlink CC and uplink CC may correspond to a single cell. A carrier frequency is a center frequency of a CC or a cell. Thus, when a UE supports a plurality of CCs, it means that the UE is able to transmit and/or receive data to or from a plurality of CCs corresponding to a plurality of serving cells.

Figure 11:
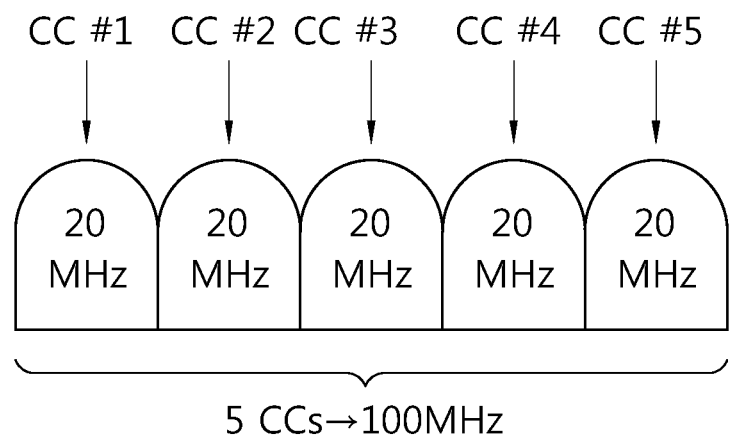
FIG. 11 illustrates an example of multiple carriers.

FIG. 11 illustrates an example of multiple carriers. Five CCs (CC #1, CC #2, CC #3, CC #4, CC #5) are provided, and each CC has a bandwidth of 20 MHz. Thus, when five CCs are allocated as granularity of CC units each having a bandwidth of 20 MHz, a maximum of 100 MHz bandwidth can be supported.

The bandwidth or number of CCs is merely illustrative. Each CC may have a different bandwidth. The number of downlink CCs and that of uplink CCs may be the same or different.

Figure 12:
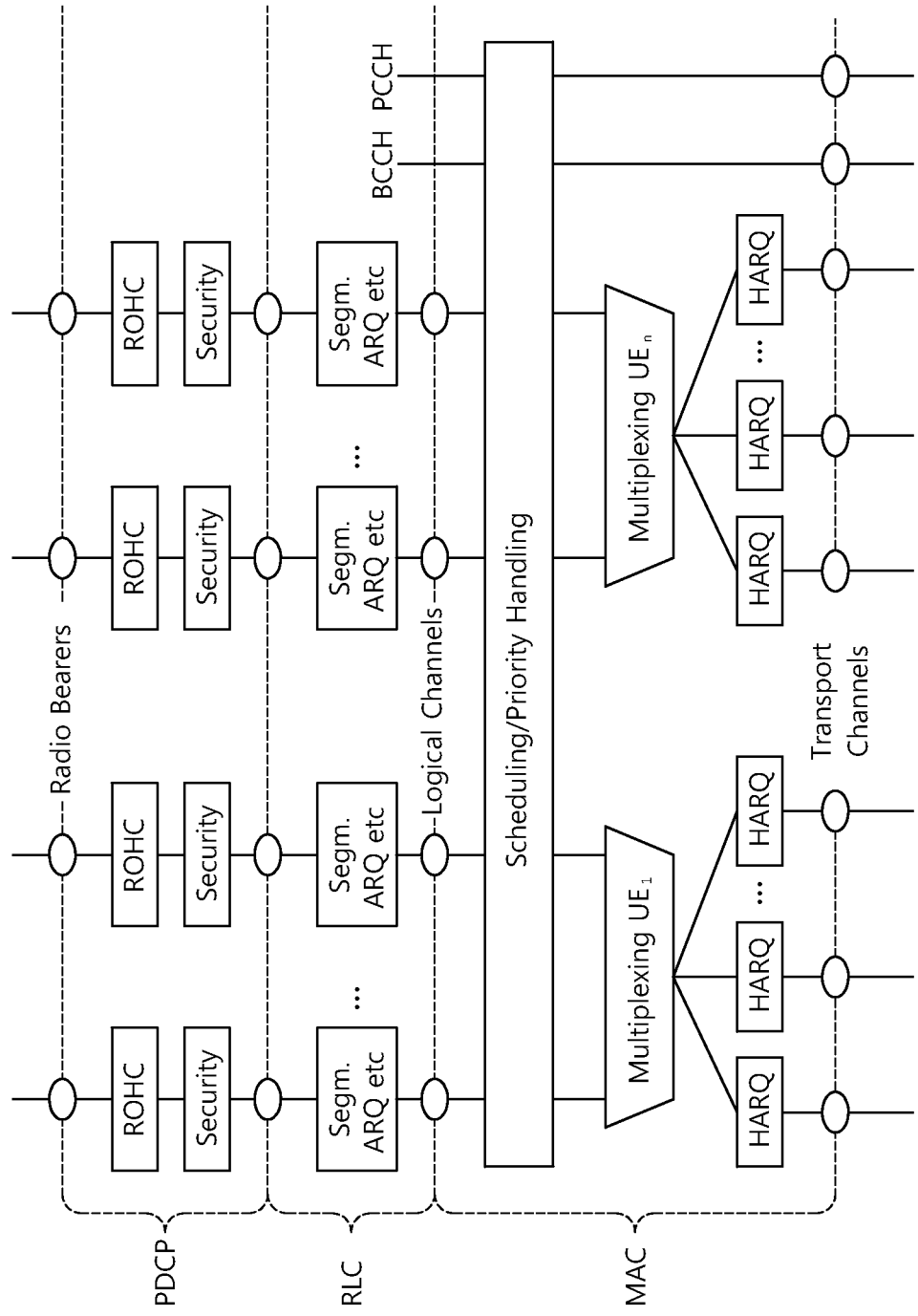
FIG. 12 illustrates a structure of a second layer of the BS for multiple carriers.
Figure 13:
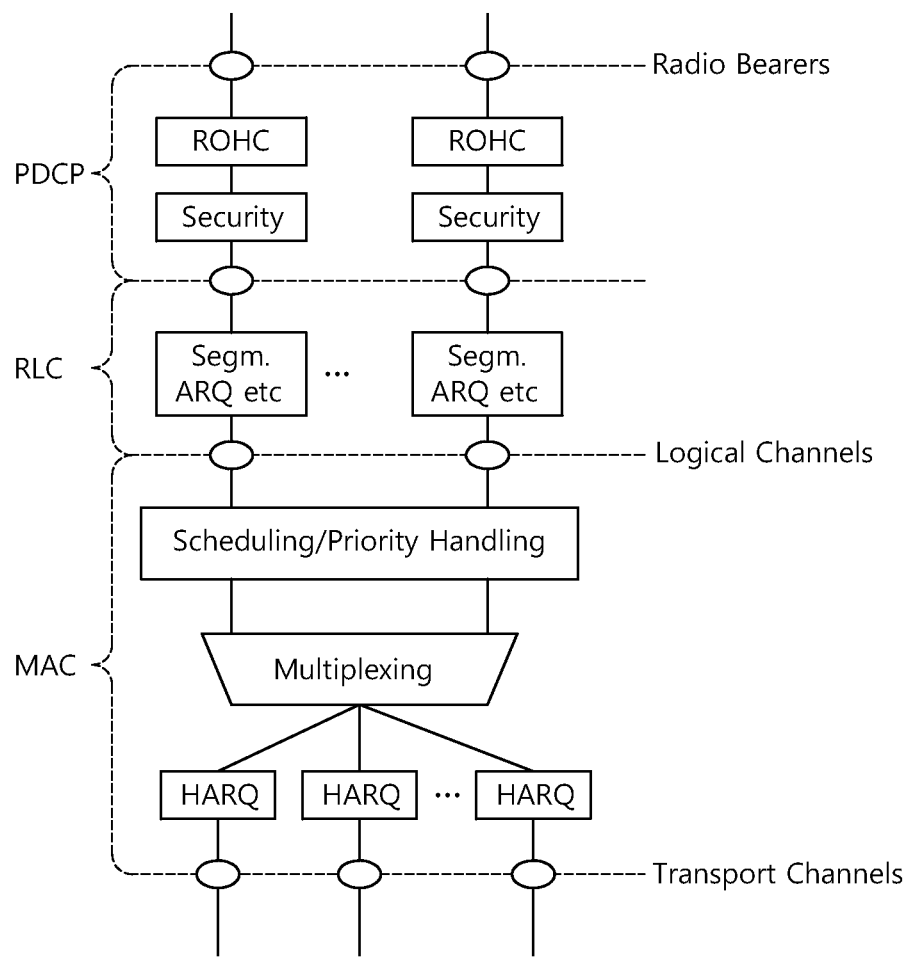
FIG. 13 illustrates a structure of a second layer of the UE for multiple carriers.

FIG. 12 illustrates a structure of a second layer of the BS for multiple carriers. FIG. 13 illustrates a structure of a second layer of the UE for multiple carriers.

The MAC layer may manage one or more CCs. One MAC layer includes one or more HARQ entities. One HARQ entity performs HARQ on one CC. Each HARQ entity independently processes a transport block on a transport channel. Thus, a plurality of HARQ entities may transmit or receive a plurality of transport blocks through a plurality of CCs.

In case of a UE available for a configuration of a plurality of serving frequencies or a plurality of serving cells, the UE has a larger number of management objects to be potentially measured than that of the case in which only a single serving cell is set.

According to the related art, since a single serving cell is provided, a UE uses only one threshold value. The UE determines a management object by comparing quality of the serving cell with the threshold value. However, how effectively a UE, for which a plurality of serving cells are set, performs measurement has not been presented.

According to an embodiment of the present invention as proposed, a UE receives a plurality of threshold values in relation to measurement from a BS. The UE performs measurement on a plurality of serving cells by using the plurality of threshold values.

A serving frequency is a frequency used by a serving cell. When a plurality of serving cells exist, there may be a plurality of corresponding serving frequencies.

Serving cells may be classified into a primary cell and a secondary cell. The primary cell is a cell in which the UE establishes or re-establishes an RRC connection with the BS. The secondary cell is a cell activated or deactivated according to an instruction from the primary cell. There may be one primary cell and one or more secondary cells for the UE. A serving frequency used by the primary cell is called a primary frequency, and a serving frequency used by the secondary cell is called a secondary frequency.

The UE uses at least two threshold values (e.g., a first threshold value Ta and a second threshold value Tb). The UE compares the two threshold values with a reference quality value and determines a management object which is to be necessarily measured according to the comparison results. The first threshold value Ta is a quality value higher than that of the second threshold value Tb.

When a plurality of threshold values are used, the UE may classify management objects to be necessarily measured more specifically according to a reference quality value.

First, when the reference quality value of the UE is quite high, namely, when the reference quality value is higher than a first threshold value, the UE may set cells to be necessarily measured to maintain quality of service (QoS) to a minimum level to save power required for measurement.

Second, when the reference quality value of the UE is equal to or lower than the first threshold value, the UE searches for a neighbor cell having good quality. However, in order to save power required for measurement, the UE may limit a management object to a serving frequency.

Third, when the reference quality value of the UE is equal to or lower than a second threshold value, the UE measures all the cells considered to be management objects thereof to make the utmost to prevent a service interruption. Frequencies corresponding to respective management objects on a management object list set for the UE are included in the management object of the UE.

Figure 14:
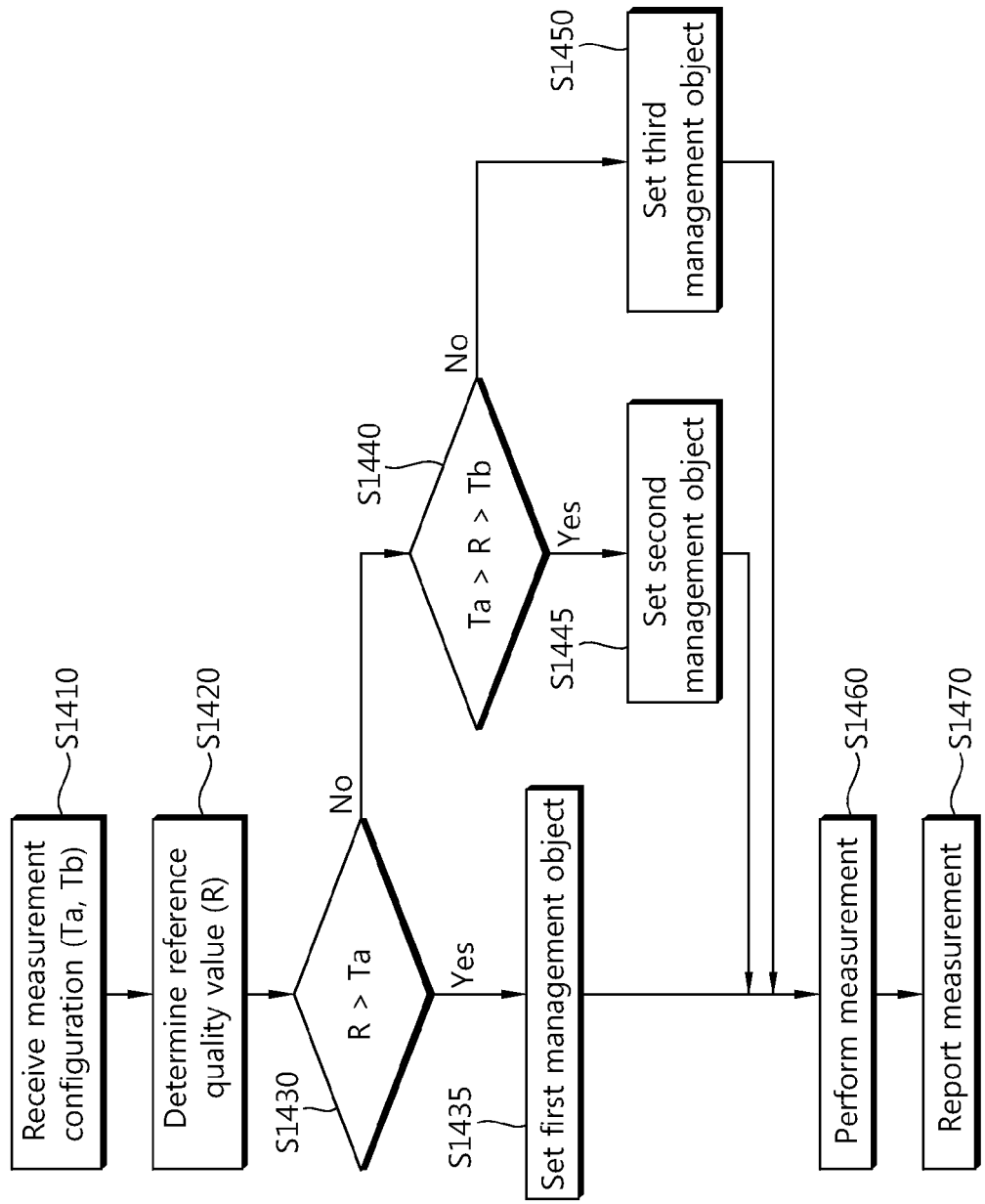
FIG. 14 is a flow chart illustrating a method for performing measurement according to an embodiment of the present invention.

FIG. 14 is a flow chart illustrating a method for performing measurement according to an embodiment of the present invention.

The UE receives measurement configuration (S1410). The measurement configuration includes measurement configuration with respect to a plurality of serving cells, a first threshold value, and a second threshold value.

The UE determines a reference quality value R (S1420). The reference quality value is a value determined in consideration of quality of at least one serving cells, which may be regarded as a value representing quality values of a plurality of serving cells.

The reference quality value may be a quality value of one or more serving cells selected from a plurality of serving cells. For example, the reference quality value may be a quality value of a primary cell. The reference quality value may be a quality value of a cell having the highest quality or a quality value of a cell having the lowest quality among a plurality of serving cells.

The UE may receive information regarding setting a reference quality value from the BS. The BS may provide information regarding a serving cell to be used as a reference quality value to the UE.

The reference quality value may be an average value or a statistical value of quality values of a plurality of serving cells.

The UE compares the reference quality value R with the first threshold value Ta (S1430). When the reference quality value R is greater than the first threshold value Ta, the UE sets a first management object as a management object (S1435).

When the reference quality value R is smaller than the first threshold value Ta, the UE checks whether or not the reference quality value R is between the first threshold value Ta and the second threshold value Tb (S1440). When the reference quality value R is between the first threshold value Ta and the second threshold value Tb, the UE sets a second management object as a management object (S1445).

When the reference quality value R is not between first threshold value Ta and the second threshold value Tb, the UE sets a third management object as a management object (S1450).

The UE performs measurement on the set management object (S1460). When report conditions with respect to the set management object are met, the UE reports measurement results (S1470).

In this manner, the UE sets a management object by comparing the reference quality value with the first and second threshold values.

The first management object may include all the serving cells. The first management object may include a primary cell and one or more secondary cells. The UE may limit the first management object into serving cells to minimize power required for measurement.

The second management object may include all the serving cells and a neighbor cell on a primary frequency. Alternatively, the second management object may include all the serving cells and neighbor cells on all the serving frequencies.

The third management object may include all the serving cells, neighbor cells on the all the serving frequencies, and a non-serving frequency. The UE may perform measurement on the cells of all the frequencies for which a measurement object is configured through measurement configuration. The third management object may include cells on the all the serving frequencies and all the frequencies included in management objects and activated by measurement IDs.

When a plurality of serving cells are set, QoS level of the UE can be maintained and power consumption of the UE used for measurement can be reduced.

Figure 15:
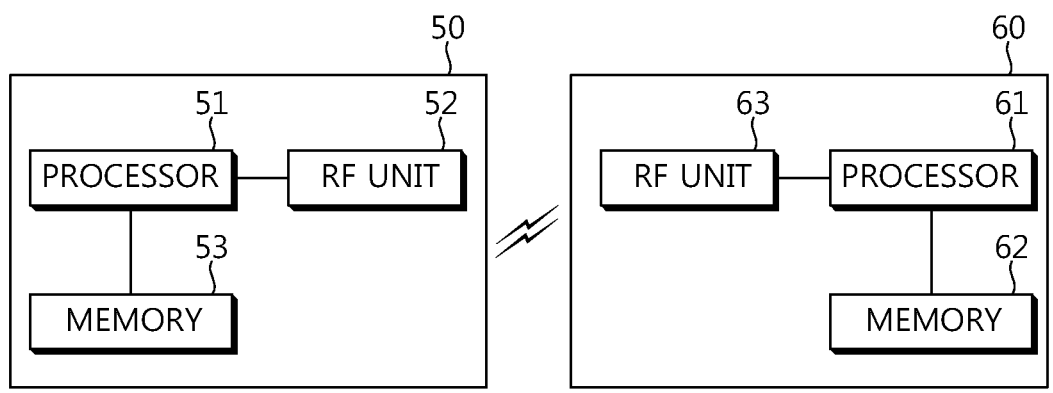
FIG. 15 is a block diagram illustrating a wireless communication system in which an embodiment of the present invention is implemented.

FIG. 15 is a block diagram illustrating a wireless communication system in which an embodiment of the present invention is implemented.

A BS 50 includes a processor 51, a memory 52, and an RF unit 53. The memory 52 is connected to the processor 51 and stores various types of information for driving the processor 51. The RF unit 53 is connected to the processor 51 and transmits and/or receives radio signals. The processor 51 implements the proposed functions, processes, and/or methods. In the embodiment of FIG. 14, the operation of the BS 50 may be implemented by the processor 51.

A UE 60 includes a processor 61, a memory 62, and an RF unit 63. The memory 62 is connected to the processor 61 and stores various types of information for driving the processor 61. The RF unit 63 is connected to the processor 61 and transmits and/or receives radio signals. The processor 61 implements the proposed functions, processes, and/or methods. In the embodiment of FIG. 14, the operation of the UE 60 may be implemented by the processor 61.

The processor may include an ASIC (Application-Specific Integrated Circuit), a chip-set, a logical circuit and/or a data processor. The memory may include a ROM (Read-Only Memory), a RAM (Random Access Memory), a flash memory, a memory card, a storage medium, and/or any other storage devices. The RF unit may include a baseband circuit for processing a radio signal. When the embodiments are implemented by software, the foregoing techniques may be implemented by modules (processes, functions, or the like) performing the foregoing functions. The modules may be stored in the memory and executed by the processor. The memory may be provided within or outside the processor, or may be connected to the processor through a well-known unit.

In the exemplary system as described above, the methods are described based on the flow chart by sequential steps or blocks, but the present invention is not limited to the order of the steps, and a step may be performed in different order from another step as described above or simultaneously performed. It would be understood by a skilled person in the art that the steps are not exclusive, a different step may be included, or one or more of the steps of the flow chart may be deleted without affecting the scope of the present invention.

What is claimed is:

1. A method for performing measurement by a user equipment (UE) in a wireless communication system, the method comprising:
   determining a reference quality value based on quality values of a plurality of serving cells, wherein the determination of the reference quality value is performed when the plurality of serving cells is configured to the UE;
   determining a management object by comparing the reference quality value with a first threshold value and a second threshold value,
   wherein if the reference quality value is greater than the first threshold value, a first management object is determined as the management object, if the reference quality value is between the first threshold value and the second threshold value, a second management object is determined as the management object, and if the reference quality is smaller than the second threshold value, a third management object is determined as the management object,
   wherein the first management object includes only the plurality of serving cells,
   wherein the second management object includes the plurality of serving cells and neighbor cells on a plurality of serving frequencies corresponding to the plurality of serving cells, and
   wherein the third management object includes the plurality of serving cells, the neighbor cells on a plurality of serving frequencies corresponding to the plurality of serving cells, and cells on non-serving frequencies; and
   performing a measurement on the determined management object.

2. The method of claim 1, wherein the reference quality value is a quality value of one serving cell selected from among the plurality of serving cells.

3. The method of claim 2, wherein the reference quality value is a quality value of a primary cell.

4. The method of claim 1, wherein the UE is in a radio resource control (RRC) connected state.

5. The method of claim 1, further comprising:
   receiving information regarding the first and second threshold values from a base station.

6. An apparatus for performing measurement in a wireless communication system, the apparatus comprising:
   a radio frequency (RF) unit configured to transmit and receive a radio signal; and
   a processor connected to the RF unit, wherein the processor is configured to:
   determine a reference quality value based on quality values of a plurality of serving cells,
   wherein if the reference quality value is greater than the first threshold value, a first management object is determined as the management object, if the reference quality value is between the first threshold value and the second threshold value, a second management object is determined as the management object, and if reference quality value is smaller than the second threshold value, a third management object is determined as the management object,
   wherein the first management object includes only the plurality of serving cells, wherein the second management object includes the plurality of serving cells and neighbor cells on a plurality of serving frequencies corresponding to the plurality of serving cells, and wherein the third management object includes the plurality of serving cells, the neighbor cells on a plurality of serving frequencies corresponding to the plurality of serving cells, and cells on non-serving frequencies, and perform a measurement on the determined management object.

* * * * *